US008789759B2

(12) United States Patent
Xian et al.

(10) Patent No.: US 8,789,759 B2
(45) Date of Patent: Jul. 29, 2014

(54) LASER SCANNING CODE SYMBOL READING SYSTEM EMPLOYING MULTI-CHANNEL SCAN DATA SIGNAL PROCESSING WITH SYNCHRONIZED DIGITAL GAIN CONTROL (SDGC) FOR FULL RANGE SCANNING

(71) Applicant: Metrologic Instruments, Inc., Blackwood, NJ (US)

(72) Inventors: Tao Xian, Bordentown, NJ (US); Ynjiun P. Wang, Cupertino, CA (US); Yong Liu, Suzhou (CN); Chen Feng, Snohomish, WA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/895,616

(22) Filed: May 16, 2013

(65) Prior Publication Data

US 2013/0306734 A1    Nov. 21, 2013

Related U.S. Application Data

(60) Provisional application No. 61/632,425, filed on May 18, 2012.

(51) Int. Cl.
*G06K 7/10* (2006.01)

(52) U.S. Cl.
USPC ............ 235/462.33; 235/462.06; 235/462.42

(58) Field of Classification Search
USPC .......................... 235/462.33, 462.06, 462.42
See application file for complete search history.

(56) References Cited

U.S. PATENT DOCUMENTS

| | | | |
|---|---|---|---|
| 4,665,513 A * | 5/1987 | Wengler | 369/53.35 |
| 4,792,666 A | 12/1988 | Cherry et al. | |
| 4,843,222 A | 6/1989 | Hochgraf | |
| 5,148,008 A | 9/1992 | Takenaka | |
| 5,168,148 A | 12/1992 | Giebel | |
| 5,288,983 A | 2/1994 | Nakazawa | |
| 5,612,259 A | 3/1997 | Okutomo et al. | |
| 5,635,700 A * | 6/1997 | Fazekas | 235/462.06 |
| 5,701,003 A | 12/1997 | Chisholm et al. | |
| 5,914,478 A | 6/1999 | Bridgeall et al. | |
| 5,963,513 A * | 10/1999 | Lemelson | 369/14 |
| 6,073,848 A | 6/2000 | Giebel | |
| 6,827,272 B2 | 12/2004 | Kolstad | |
| 7,172,125 B2 | 2/2007 | Wang et al. | |
| 7,822,349 B2 | 10/2010 | Roosli et al. | |
| 2012/0178081 A1 * | 7/2012 | Nguyen et al. | 435/6.11 |

* cited by examiner

*Primary Examiner* — Allyson Trail
(74) *Attorney, Agent, or Firm* — Additon, Higgins, Pendleton & Ashe, P.A.

(57) ABSTRACT

A laser scanning code symbol reading system includes an analog scan data signal processor for producing digital data signals, wherein during each scanning cycle, a light collection and photo-detection module generates an analog scan data signal corresponding to a laser scanned code symbol, a multi-channel parallel scan data signal processor/digitizer processes the analog scan data signal along multiple cascaded multi-stage signal processing channels, to generate digital data signals corresponding thereto, while a synchronized digital gain control module automatically processes the digital data signals in response to start of scan (SOS) signals generated by a SOS detector. Each signal processing channel supports different stages of amplification and filtering using a different set of band-pass filtering and gain parameters in each channel, to produce multiple digital first derivative data signals, and/or multiple digital scan data intensity data signals, having different signal amplitudes and dynamic range characteristics for use in decode processing.

20 Claims, 9 Drawing Sheets

LASER SCANNING CODE SYMBOL READING SYSTEM EMPLOYING MULTI-CHANNEL SCAN DATA SIGNAL PROCESSING WITH SYNCHRONIZED DIGITAL GAIN CONTROL (SDGC) FOR FULL RANGE SCANNING

CROSS-REFERENCE TO PRIORITY APPLICATION

The present application claims the benefit of U.S. Patent Application No. 61/632,425 for a Laser Scanning Code Symbol Reading System Employing Multi-Channel Scan Data Signal Processing With Synchronized Digital Gain Control (SDGC) For Full Range Scanning, filed May 18, 2012, which is hereby incorporated by reference in its entirety.

BACKGROUND OF DISCLOSURE

1. Field of Disclosure

The present disclosure relates generally to improvements in reading code symbols on objects located anywhere over a large scanning range (e.g. 3 inches to over 30 feet from a scanning window), and more particularly, to an improved method of and apparatus for processing analog scan data signals received during the laser scanning of objects located over large scanning distances.

2. Brief Description of the State of Knowledge in the Art

It is well known to scan bar code symbols on objects for purposes of automatically identifying the objects in diverse fields of use. Currently, several basic optical methods have been developed over the past three or more decades.

According to one method, bar code symbols are read by scanning a laser beam across the bar code symbol, and collecting and processing light from the return laser beam to extract information modulated onto the scanned beam by the light reflective characteristics of the bar code structure.

According to a second method, bar code symbols are read by capturing and buffering a digital image of a bar code symbol, and processing the digital image to recognize the bar code structure.

When using either method described above, the further that the object bearing the bar code symbol resides from a laser scanner, the weaker the return laser light signal will be at the time of signal detection at the photo-detector. Moreover, providing a system with the capacity to read reflective bar code symbols at near distances also increases dynamic range requirements of the system. Also, the further that the object bearing the bar code symbol resides from a digital imager, the weaker digital image intensity will be at the time of image detection. For laser scanners having a substantially large scanning, or working range, in particular, this potentially dramatic variation in signal intensity strength at the photo-detector places great demands on the electronic signal processing circuitry and its ability to deliver sufficient signal-to-noise-ratio (SNR) performance over broad dynamic ranges of input signal operation.

Consequently, great efforts have been made of the past few decades to provide laser scanning type bar code scanners, in particular, with automatic gain control (AGC) capabilities that aim to control the gain of the various analog scan data signal processing stages, regardless of the input laser return signal strength. The following U.S. patents describe prior art efforts to date to provide automatic gain control (AGC) capabilities in laser scanning bar code symbol readers: U.S. Pat. Nos. 7,822,349; 7,172,125; 6,827,272; 6,073,848; 5,914,478; 5,701,003; 5,612,259; 5,288,983; 5,168,148; 5,148,008; 4,843,222; and 4,792,666, incorporated herein by reference as set forth herein.

In general, a feedback control is implemented in the analog domain, and the gain of an amplified stage is adjusted according a controller. The controller could be, but is not limited to, proportional control, PID control or fuzzy logic control, etc. Also, the amplifier refers to, but is not limited to preamplifier or gain stages along the signal path.

When performing middle and long range laser scanning, variable gains along the signal processing chain are desired to improve signal quality. Such multi-stage gain control is extremely important when a barcode target is located in the far field, which could be at least 30 feet away from the laser scanner.

During laser scanning bar code symbols, it is preferred that the gain is maintained substantially constant during each scan line sweep so that signal linearity is maintained, which is important for the barcode decoding. However, the AGC circuitry must have a fast response time once the object scanning distance and/or other parameters are changed. Thus, automatic gain control (AGC) suffers from a dilemma: how to maintain fast response time without sacrificing signal linearity during each scanning cycle.

Conventional analog AGC circuits have to change the gain continuously which limits the response time for automatic gain control. Moreover, the requirement of linearity during scan line generation further limits the usage of conventional AGC techniques in many applications. Also, it is known that digital AGC circuits can respond quickly between gain changes which gain adjustment significantly faster than analog-based AGC circuits.

However, despite the many improvements in AGC methods in laser scanning bar code symbol readers over the years, there is still a great need in the art for an improved laser scanning bar code symbol reading system which exhibits fast response time and signal linearity, while avoiding the shortcomings and drawbacks of prior art systems and methodologies.

OBJECTS AND SUMMARY

Accordingly, a primary object of the present disclosure is to provide an improved laser scanning bar code symbol reading system for use in scanning code symbols over long distances in diverse environments, which avoids the shortcomings and drawbacks of prior art systems and methodologies.

Another object is to provide a laser scanning code symbol reading system employing a multi-channel parallel cascaded signal processing subsystem in conjunction with a synchronized digital gain control (SDGC) module and a start of scan (SOS) detector to support full range scanning of bar-coded objects over long scanning distances in diverse environments.

Another object is to provide a laser scanning bar code symbol reading system employing a multi-channel parallel cascaded scan data signal processing architecture comprising multiple multi-stage first derivative signal processing channels, wherein each first derivative signal processing channel provides a different stage of amplification and filtering to the cascaded pre-amplified analog first derivative signal using a different set of band-pass filtering and gain parameters in each channel to produce multiple digital first derivative data signals having different signal amplitudes and dynamic range characteristics for use in synchronized gain control of the first channel amplification stage, as well as decode processing, during each scanning cycle.

Another object is to provide a laser scanning bar code symbol reading system employing a multi-channel parallel cascaded scan data signal processing architecture comprising multiple multi-stage raw scan data (intensity) signal processing channels, wherein each raw scan data intensity signal processing channel provides a different stage of amplification and filtering to the cascaded pre-amplified analog raw scan data intensity signal using a different set of band-pass filtering and gain parameters in each channel to produce multiple digital scan data intensity data signals having different signal amplitudes and dynamic range characteristics, for use in decode processing, during each scanning cycle (and optionally in synchronized gain control of the first channel amplification stage).

Another object is to provide such a laser scanning code symbol reading system, wherein its multi-channel parallel cascaded signal processing subsystem has N multi-stage signal processing channels, where channels 2 though N−1 are fed with an analog scan data signal that has been amplified by a digitally-controlled amplification stage.

Another object is to provide such a laser scanning code symbol reading system, wherein its multi-channel parallel cascaded signal processing subsystem has N multi-stage scan data signal processing channels, where each scan data signal processing channel 2 though N−1 is fed with a cascaded amplified analog scan data signal derived from a digitally-controlled amplification stage in the first multi-stage scan data signal processing channel having a gain that is controlled by a synchronized digital gain control (SDGC) module.

Another object is to provide such a laser scanning code symbol reading system, wherein its multi-channel parallel cascaded signal processing subsystem includes a first derivative signal processing stage located before its N multi-stage scan data signal processing channels so that a first derivative of the analog scan data signal is supplied to the input port of the digitally-controlled amplification stage of the first multi-stage scan data signal processing channel, and each N−1 multi-stage scan data signal processing channel, 2 though N, is fed with a cascaded version of the amplified first derivative data signal, so that each multi-stage signal processing channel produces a digital first derivative data signal with different signal amplitude and a different dynamic range for use in synchronized gain control as well as decode processing.

Another object is to provide such a laser scanning code symbol reading system, wherein the band-pass filter and gain characteristics of the filtering stage in each multi-stage scan data signal processing channel are selected so that different signal processing channels process a different band of signal frequencies with different levels of signal gain, so as to provide different levels of dynamic range in signal amplitude.

Another object is to provide such a laser scanning bar code symbol reading system, wherein the digital gain control in the multi-channel parallel cascaded signal processing subsystem is synchronized using start of scan (SOS) signals generated each time the laser scanning assembly undergoes a complete scanning cycle, and discrete gain changes are generated and provided to the gain-controlled amplification stage only at a certain windows along the time domain.

Another object is to provide such a laser scanning bar code symbol reading system, wherein the synchronized digital gain control (SDGC) module can be used to implement gain adjustments at one or more points along the analog scan data signal path of the first multi-stage signal processing channel, including, but not limited to, preamplifier stages, derivative stages, and filtering stages.

Another object is to provide a method of controlling the gain of a multi-channel signal processing subsystem employed in a laser scanning code symbol reading system, wherein digital gain control data is automatically produced during each laser beam scanning cycle.

These and other objects will become apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein:

FIG. 3 is a schematic block diagram of the laser scanning bar code symbol reading system illustrated in FIG. 1, describing the architecture of the multi-channel parallel cascaded scan data signal processing system, employing a synchronized digital gain control (SDGC) module to control the gain of the digitally-controlled first amplification stage in the first signal processing channel, wherein the multi-channel parallel cascaded signal processing subsystem comprises (i) multiple multi-stage first derivative signal processing channels, and (ii) multiple multi-stage raw scan data (intensity) signal processing channels, wherein each first derivative signal processing channel provides a different stage of amplification and filtering to the cascaded pre-amplified analog first derivative signal using a different set of band-pass filtering and gain parameters in each channel to produce multiple digital first derivative data signals having different signal amplitudes and dynamic range characteristics for use in synchronized gain control of the first channel amplification stage, as well as decode processing, during each scanning cycle, and wherein each raw scan data intensity signal processing channel provides a different stage of amplification and filtering to the cascaded pre-amplified analog raw scan data intensity signal using a different set of band-pass filtering and gain parameters in each channel, to produce multiple digital scan data intensity data signals having different signal amplitudes and dynamic range characteristics, for use in decode processing, during each scanning cycle (and optionally in synchronized gain control of the first channel amplification stage);

DETAILED DESCRIPTION OF THE ILLUSTRATIVE EMBODIMENTS

Referring to the figures in the accompanying Drawings, the illustrative embodiments of the laser-scanning bar code symbol reading system will be described in great detail, wherein like elements will be indicated using like reference numerals Overview of the Laser Scanning Bar Code Symbol Reading System Employing a Multi-Channel Parallel Cascaded Signal Processing Subsystem with Synchronized Digital Gain Control Referring now to FIGS. 1 through 2, the hand-supportable laser scanning bar code symbol reading system 100 will be described in detail.

Figure 1:
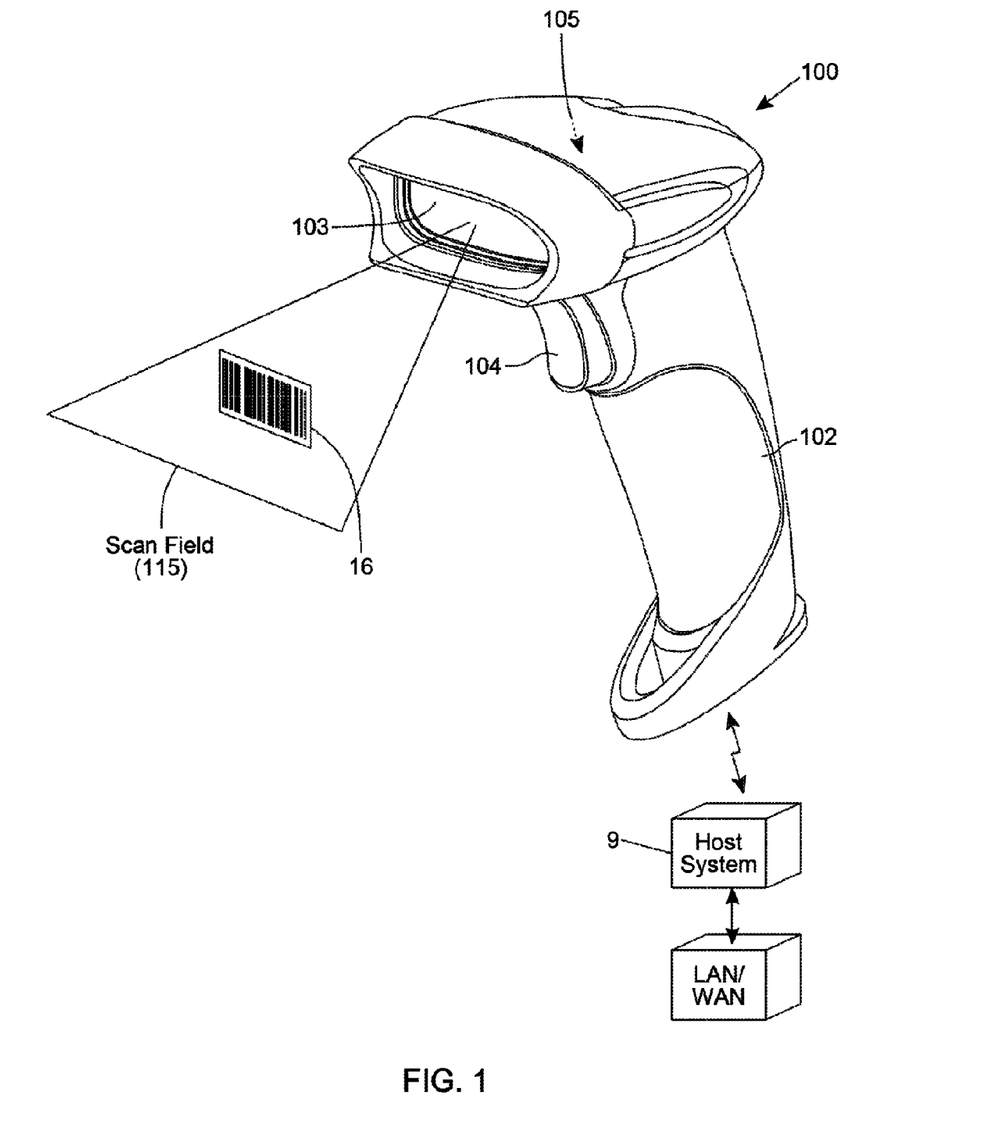
FIG. 1 is a perspective view of an illustrative embodiment of a hand-supportable laser scanning bar code symbol reading system of the present disclosure having the capacity to read bar code symbols over a large working range where the intensity of return laser signals will vary drastically due to distance-related attenuation factors.
Figure 2:
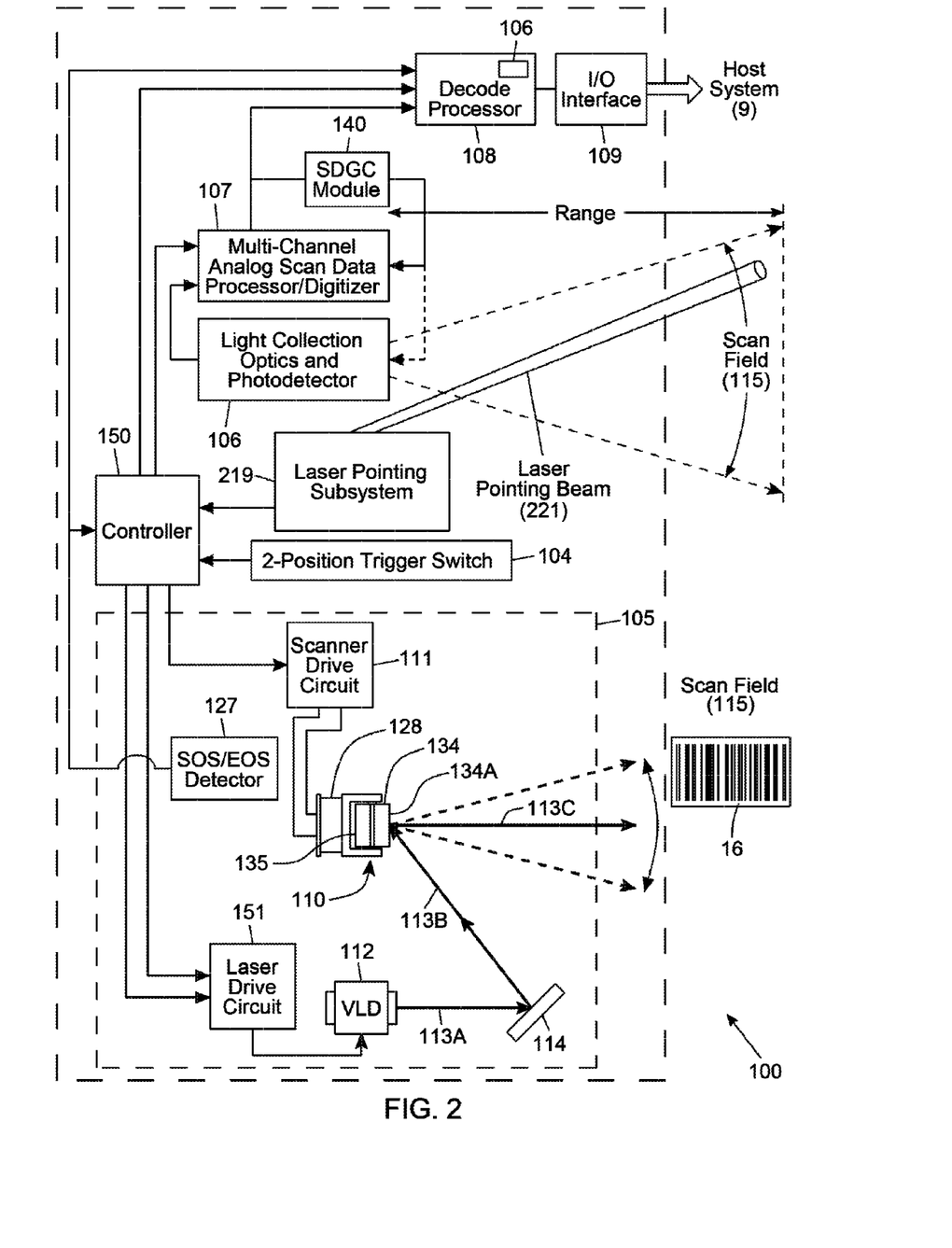
FIG. 2 is a schematic block diagram of the system shown in FIG. 1 describing the major system components of the laser scanning bar code symbol reading system illustrated in FIG. 1 including the multi-channel parallel signal processing subsystem employing synchronized digital gain control (SDGC) control.

As shown in FIGS. 1 and 2, the hand-supportable laser scanning bar code symbol reading system 100 is shown comprising the following components: a hand-supportable housing 102 having a head portion and a handle portion supporting the head portion; a light transmission window 103 integrated with the head portion of the housing 102; a 2-position manually-actuated trigger switch 104 integrated with the handle portion of the housing 102 for sending trigger signals to controller 150 and activating the laser pointing/aiming subsystem 219 and the laser scanning module 105; a laser scanning module 105 for repeatedly scanning, across the laser scanning field, a visible laser beam generated by a laser source 112 (e.g. VLD or IR LD) having optics to produce a laser scanning beam focused in the laser scanning field in response to a control signal generated by a system controller 150; wherein the laser scanning module 105 also includes a laser drive circuit 151 for receiving control signals from system controller 150, and in response thereto, generating and delivering laser (diode) drive current signal to the laser source 112 to produce a laser scanning beam during the method of bar code symbol reading described in FIG. 4; a start of scan/end of scan (SOS/EOS) detector 127 for generating SOS timing signals indicating the start of each laser beam sweep (i.e. scanning cycle), and EOS timing signals indicating the end of each laser beam sweep, and sending these SOS/EOS timing signals to the system controller 150, as well as decode processor 108 and SDGC module 109; a set of scan line data line buffers 160 for buffering each complete line of scan data collected during a complete sweep of the laser scanning beam across the laser scanning field during each scanning cycle (i.e. one buffer for each scanning direction); a photo-collection and photo-detection module 106 including (i) light collection optics for collecting light reflected/scattered from a scanned object in the scanning field, and (ii) a photo-detector for detecting the intensity of collected light and generating an analog scan data signal corresponding to said detected light intensity during scanning operations; a multi-channel parallel cascaded scan data signal processing subsystem (e.g. ASIC chip) 107 having a (first-derivative) differentiation stage 107A coupled to a plurality of parallel cascaded multi-stage first derivative signal processing channels 107B', 107C' through 107N' (i.e. cascaded at the amplifier stage level), and also a plurality of parallel cascaded multi-stage raw scan data intensity signal processing channels 107B, 107C through 107N (i.e. also cascaded at the amplifier stage level), wherein the (first) first derivative signal processing channel 107B' (i) amplifies and filters the first derivative scan data signal produced from the differentiation stage 107A, and (ii) converts the amplified and filtered first derivative signal into a corresponding digital amplified and filtered first derivative signal, while each other first derivative signal processing channel amplifies and filters the amplified first derivative signal from the previous cascaded channel, so that each signal processing channel generates a digital first derivative signal with a different signal amplitude and a different level of dynamic range (due to spectral filtering), and these multiple digital first derivative data signals are provided, in parallel, as output to (i) the SDGC module 140 for generating digital control data for the digitally-controlled first channel amplification stage 107B1'; the decode processing module 109 for decode processing and recognition/decoding/reading of bar code symbols and generation of corresponding symbol character data representative thereof; a scan data signal intensity detection module 143, preferably implemented within multi-channel parallel cascaded scan data signal processing subsystem 107 for continuously (i) processing the return analog (or digital) scan data signals, (ii) detecting and analyzing the intensity (i.e. magnitude) of the laser return signal, (iii) determining (e.g. estimating) the range or distance of the scanned object relative to the scanning window, and (iv) transmitting the range indication (i.e. estimation) signal (e.g. in the form of a digital data value) to the decode processor 208 for optional use therein during decode processing; an (optional) intermediate signal processing module 108 for buffering (e.g. queuing) and/processing digital data elements ($\{f_n(t)\}$, $\{f_n'(t)\}$ output from the signal processing channels of the multi-channel parallel scan data signal processing subsystem 107, using SOS/EOS signals from SOS/EOS detector 127, and other input parameters, and providing digital data elements $\{f_n(t)\}$, $\{f_n'(t)\}$ to programmed decode processor 208; programmed decode processor 208 for decode processing digital data signals (e.g. digital first derivative data signals $\{f_n'(t)\}$, and/or digital raw scan data signals $\{f_n(t)\}$) and generating symbol character data representative of each bar code symbol scanned by the laser scanning beam; synchronized digital gain control (SDGC) module 140, interfaced with the multi-channel parallel cascaded scan data signal processing subsystem (ASIC chip) 107, for controlling the gain of the digitally-controlled first channel amplification stage 107B1 within multi-channel parallel cascaded scan data signal processing subsystem 107, on a real-time, scanning-cycle basis; an input/output (I/O) communication interface module 109 for interfacing with a host communication system and transmitting symbol character data thereto via wired or wireless communication links that are supported by the symbol reader and host system; and a system controller 150 for generating the necessary control data signals for controlling operations within the hand-supportable laser scanning bar code symbol reading system.

As shown in FIG. 2, the laser scanning module 105 comprises a number of subcomponents, namely: laser scanning assembly 110 with an electromagnetic coil 128 and rotatable scanning element 134 supporting a polygon mirror 134A, or an oscillating (or flipper) type laser scanning mechanism 134 supporting a planar mirror element 134A; a coil drive circuit 111 for generating an electrical drive signal to drive the electromagnetic coil 128 in the laser scanning assembly 110; and a laser beam source 112 for producing a visible laser beam 113A; and a beam deflecting mirror 114 for deflecting the laser beam 113A as incident beam 113B towards the mirror component of the laser scanning assembly 110, which sweeps the deflected laser beam 113C across the laser scanning field and a bar code symbol 16 that might be simultaneously present therein during system operation.

As shown in FIG. 2, the laser scanning module 105 is typically mounted on an optical bench, printed circuit (PC) board or other surface where the laser scanning assembly is also, and includes a coil support portion for supporting the electromagnetic coil 128 (in the vicinity of the permanent magnet 135) and which is driven by a drive circuit 111 so that it generates magnetic forces on opposite poles of the permanent magnet 135, during scanning assembly operation.

Specification of the Illustrative Embodiment of the Multi-Channel Parallel Cascaded Scan Data Signal Processing System Referring to FIG. 3, the illustrative embodiment of the multi-channel parallel cascaded scan data signal processing system architecture will be described in greater technical detail.

Figure 3:
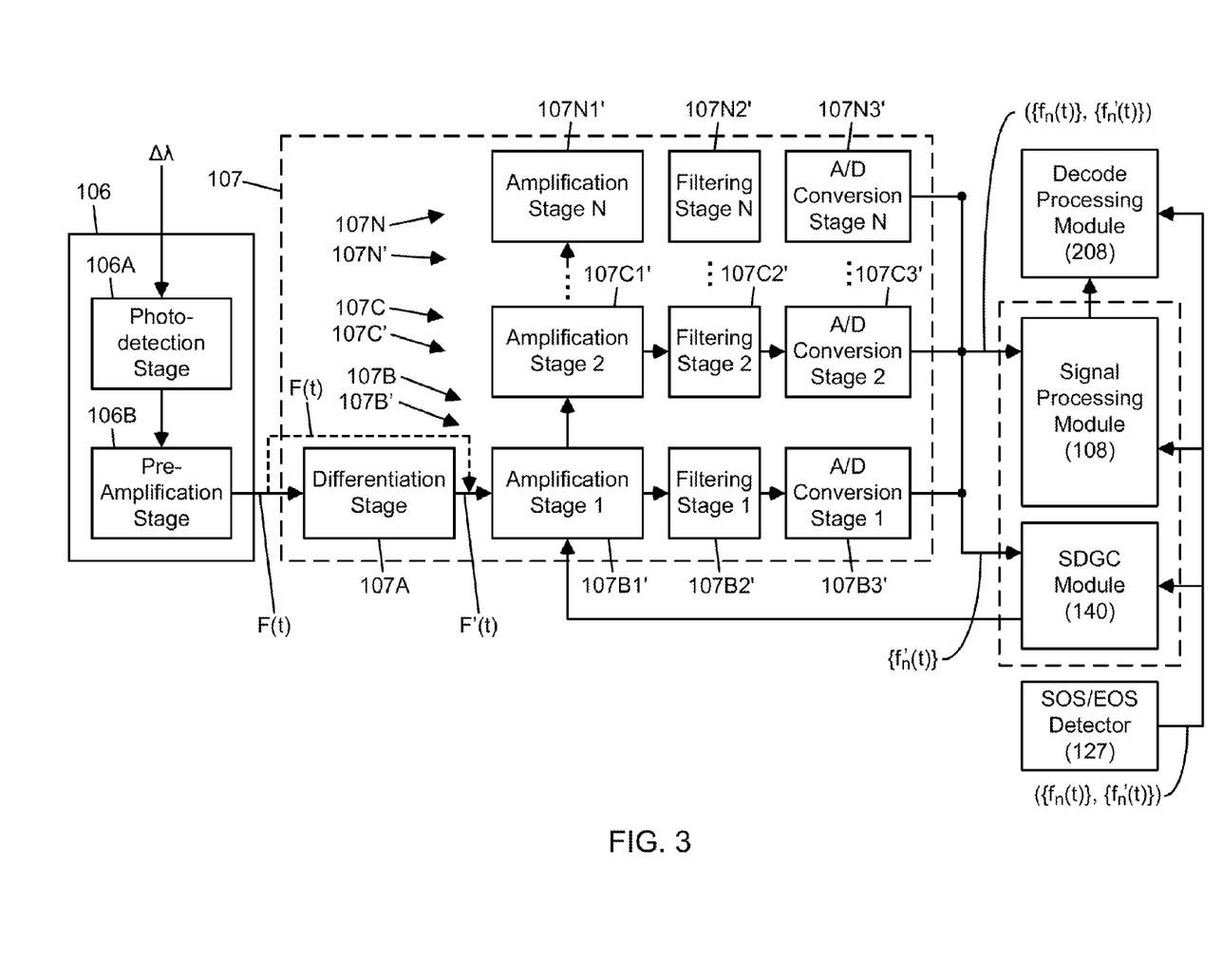

As shown in FIG. 3, the photo-collection and photo-detection module 106 includes at least a photo-detection stage 106A and a pre-amplification stage 106B.

FIG. 3 describes an illustrative embodiment of a multi-channel parallel cascaded scan data signal processing subsystem 107 employing the synchronized digital gain control (SDGC) process supported in the laser scanning bar code symbol reading system of FIG. 1. As shown, subsystem 107 interfaces with the intermediate signal processing module 108 and the SDGC module 140 by way of a system bus or other data transfer mechanism known in the art. Similarly, decode processing module 208 is interfaced with intermediate signal processing module 108, SDGC module 140 and SOS/EOS detector 127 by way of a system bus or other data transfer mechanism known in the art. As shown, modules 208, 108 and 140 receive SOS and EOS timing signals from the SOS/EOS detector 127 which can be realized using a Hall-effect sensor and one or more permanent magnets embedded in the scanner rotor or other suitable techniques known in the laser scanning art.

In general, the multi-channel parallel cascaded scan data signal processing subsystem 107, the intermediate signal processing module 108, the SGDC module 140, and the decode processing module 208 can be realized in many different ways. For example subsystem 107 can be realized (e.g. implemented) using a programmable device such as AISC, FPGA or microprocessor, but it is understood that implementation is not limited to such devices. The intermediate signal processing module 108 and the SDGC module 140 can be realized using a programmable device such as AISC, FPGA or microprocessor, but it is understood that implementation is not limited to such devices. Also, decode processing module 208 can be realized as realized by a programmable device such as a microprocessor and associated memory architecture. In other alternative embodiments where a powerful and very fast microprocessor and associated memory are available and capable of processing, in real-time, the streams of digital data output from the plurality of signal processing channels supported within the parallel processing subsystem 107, then it is possible to directly interface the output of the signal processing channels of subsystem 107 with the programmed microprocessor through a conventional system bus or other suitable data transport mechanism known in the art, and the intermediate signal processing module 108 can be eliminated from the system architecture. Other ways of implementing the system architecture of FIG. 3 will readily occur to those skilled in the art having the benefit of the present invention disclosure.

Also, as shown in FIG. 3, the multi-channel parallel cascaded scan data signal processing subsystem 107 comprises: a first differentiation stage 107A for generating a first derivative signal $F_1'(t)$ from the raw analog scan data signal $F(t)$; a signal flow pathway (shown in dotted lines) extending from the output of pre-amplification stage 106B to digitally-controlled amplification stage 107B1, to allow the analog raw scan data signal $F(t)$ to by-pass the differentiation stage 107A and be supplied directly to the input of the first amplification stage 107B1 in the first signal processing channel 107B, so that the analog raw scan data signal $F(t)$ is simultaneously processed, in parallel, (i) along the N multi-stage signal processing channels (107B through 107N) having different gain and filtering characteristics used to process the analog first derivative signal $F'(t)$ and produce a set of different digital first derivative signals $\{f_n(t)\}$ which are supplied to the intermediate signal processing module 108, and subsequently to the decode processing module 208, or alternatively, (ii) along a second set of N multi-stage signal processing channels having different gains and filtering characteristics so that N differently processed raw digital scan data signals $\{f(t)\}$ are produced and supplied to the intermediate signal processing module 108, and subsequently to the decode processing module 208; a first multi-stage first derivative signal processing channel 107B' including a first amplification stage 107B1' for constantly amplifying the first derivative scan data signal by variable gain $G_1$, a first filtering stage 107B2' for filtering the amplified first derivative signal according to impulse response function $h_1(t)$, and a first A/D signal conversion stage 107B3' for band-pass filtering, sampling and digitizing the amplified and filtered first derivative signal and generate a digital first derivative data signal $f_1'(t)$ from the first multi-stage first derivative signal processing channel 107B'; a second multi-stage first derivative signal processing channel 107C' including a second amplification stage 107C1', supplied with amplified first derivative signal from first amplification stage 107B1', for amplifying the previously amplified first derivative scan data signal by gain $G_2$, a second filtering stage 107C2' for filtering the twice amplified first derivative signal according to impulse response function $h_2(t)$, and a second A/D signal conversion stage for band-pass filtering, sampling and digitizing the amplified and filtered first derivative signal and generate a digital first derivative data signal $f_2'(t)$ from the second first derivative signal processing channel; a third multi-stage first derivative signal processing channel 107D' including a third amplification stage 107D1', supplied with amplified first derivative signal from second amplification stage 107C1', for amplifying the previously amplified first derivative scan data signal by third channel gain $G_3$, a third filtering stage 107D2' for filtering the thrice amplified first derivative signal according to impulse response function $h_3(t)$, and a third A/D signal conversion stage for band-pass filtering, sampling and digitizing the amplified and filtered first derivative signal and generate a digital first derivative data signal $f_3'(t)$ from the third first derivative signal processing channel; a (N−1)-th multi-stage first derivative signal processing channel 107(N−1) including a (N−1)th amplification stage 107(N−1)1', supplied with the amplified first derivative signal from (N−2)th amplification stage 107(N−2)1', for amplifying the previously amplified first derivative scan data signal by the (N−1)th channel gain $G_{N-1}$, a (N−1)th filtering stage 107(N−1)2' for filtering the cascade amplified first derivative signal according to impulse response function $h_{N-2}(t)$, and a (N−1)th A/D signal conversion stage 107(N−1)3' for band-pass filtering, sampling and digitizing the amplified and filtered first derivative signal and generate a digital first derivative data signal $f_{N-1}'(t)$ from the (N−1)th first derivative signal processing channel; and a (N)-th multi-stage signal processing channel 107(N)' including a (N)th amplification stage 107(N)1', supplied with the amplified first derivative signal from the (N−1)th amplification stage 107(N−1)1', for amplifying the previously cascade amplified first derivative scan data signal by the (N)th channel gain $G_N$, a (N)th filtering stage 107(N)2' for filtering the cascade amplified first derivative signal according to impulse response function $h_{N-2}(t)$, and a (N−2)th A/D signal conversion stage 107(N)3' for band-pass filtering, sampling and digitizing the amplified and filtered first derivative signal and generate a digital first derivative data signal $f_N'(t)$ from the (N)th the first derivative signal processing channel. In the illustrative embodiment, four cascaded signal processing channels are used, but more or less channels can be used as may be required or desired by the particular end-user application at hand.

Notably, each first derivative signal processed along a different first derivative signal processing channel (107B' through 107N') has a different signal level with a different level of dynamic range. The digital first derivative data signal from each first derivative signal processing channel is provided to the SDGC module 140, for processing and the generation of digital control data signals to control the gain of the digitally-controlled first amplification stage 107B1, in accordance with the principles of the present disclosure. Likewise, each raw scan data signal processed along a different raw scan data signal processing channel (107B through 107N) has a different signal level with a different level of dynamic range. While the digital raw scan data signal from each raw scan data signal processing channel is shown being provided to the intermediate processing module 108, it is understood that such digital raw scan data signals may also be provided to the SDGC module 140, for processing and use in the generation of digital control data signals to control the gain of the digitally-controlled first amplification stage 107B1, in accordance with the principles of the present disclosure.

The digitally-controlled first amplification stage 107B1 receives a discrete gain change signal (i.e. digital control data) $\Delta G(s,t)$ from the microprocessor-implemented SDGC module 109. The rate at which the module 106 receives discrete gain control updates depends on the frequency of the laser scanning mechanism (e.g. flipper mechanism, rotating polygon, etc), which is effectively measured by start of scan (SOS) signals generated by the SOS/EOS detector 12. As shown in the illustrative embodiment of FIG. 3, the SDGC module 109 updates the gain of the amplification stage 107B1 once every laser beam scanning cycle, using the synchronized digital gain control (SDGC) process depicted in FIGS. 4B and 4C. Notably, the SDGC process is called during the main control process shown in FIG. 4A, carried out in the laser scanning bar code symbol reading system 1 shown in FIG. 1, to be described herein below.

Referring to FIG. 3, it is pointed out that, optionally, the multi-channel parallel signal processing subsystem 107, may further comprise, for each first derivative signal processing channel 107N, a corresponding analog raw scan data signal channel 107N', comprising the following stages: a cascaded amplification stage for amplifying raw analog scan data signal F(t), as described above; an amplification stage for filtering the cascade amplified raw scan data signal, so that each raw analog scan data signal has a different amplitude signal level with a different level of dynamic range; and A/D signal conversion stages for band-pass filtering, sampling and digitizing the raw analog scan data signals into multiple digital raw scan data signals (e.g. digital words) f(t), and representative of the relative width of the bars and spaces in the scanned code symbol structure, for use by the SDGC module 140 and/or the decode processing module 208. As shown, the first amplification stage of this secondary signal processing path periodically receives a discrete gain change signal (i.e. digital control data) $\Delta G(s,t)$ from the microprocessor-implemented SDGC module 140. Also, it is understood, that during a hybrid mode of operation, both the analog first derivative signal F'(t), and the analog raw scan data signal F(t), can be processed simultaneously, in parallel, along parallel first derivative signal processing channels 107B' through 107N', and parallel raw scan data signal processing channels 107B through 107N, respectively, and that the corresponding digital data signals $\{f'_n(t)\}$ and $\{f_n(t)\}$ can be both used by the decode processing module 208, as desired or required by any particular application, in a manner well known in the bar code symbol decoding art.

In response to a triggering event (i.e. manually pulling trigger 104 to its first position), the system controller 150 enables subsystem 219 to generate and project a cone-like visible aiming beam 221 within the laser scanning field 115 of the system. After the aiming beam 221 is aligned with the bar code symbol to be scanned, the user pulls the trigger switch 104 to its second position. In response, the system controller 150 enables the laser scanning module 105 to generate and project a laser scanning beam through the light transmission window 103 and across the laser scanning field external to the hand-supportable housing for scanning an object in the scanning field. The laser scanning beam is generated by laser beam source 112 in response to control signals generated by the system controller 150. The scanning element (i.e. mechanism) 134 begins to repeatedly scan the selected laser beam across a code symbol residing on an object in the laser scanning field 115. Then, the light collection optics 106 collects light reflected/scattered from scanned code symbols on the object in the scanning field, and the photo-detector (in the photo-detection stage 106A) automatically detects the intensity of collected light (i.e. photonic energy) and generates an analog scan data signal (i.e. bar code pattern signal) corresponding to the light intensity detected during scanning operations. The analog scan data signal processor/digitizer module 107 processes the raw analog scan data signal F(t), as described above, and the A/D conversion stages convert the processed analog first derivative signals into a set of digital first derivative data signals $\{f'_n(t)\}$.

Figure 5A:
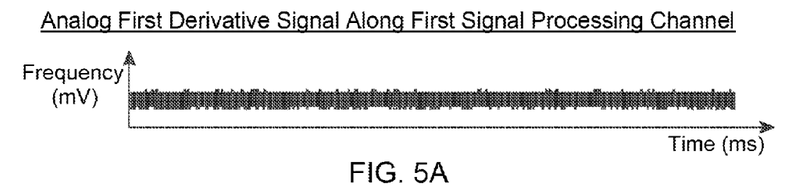
FIGS. 5A, 5B, 5C and 5D show graphical representations of four analog first derivative signals processed in parallel along the four multi-stage cascaded signal processing channels of the multi-channel parallel cascaded signal processing subsystem, wherein each analog first derivative signal has a different signal amplitude and different dynamic range characteristics, and wherein at least one of these four analog first derivative signals will have a maximized signal-to-noise (SNR) ratio, without saturation, for use, after digitizing, during decode processing to provide improved system reading performance over long scanning distances.
Figure 5B:
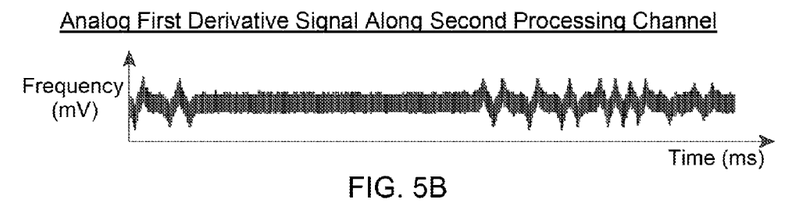
Figure 5C:
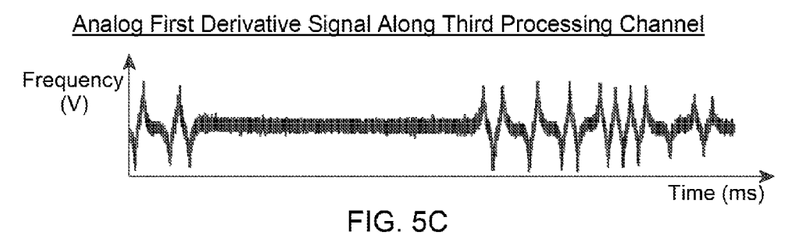
Figure 5D:
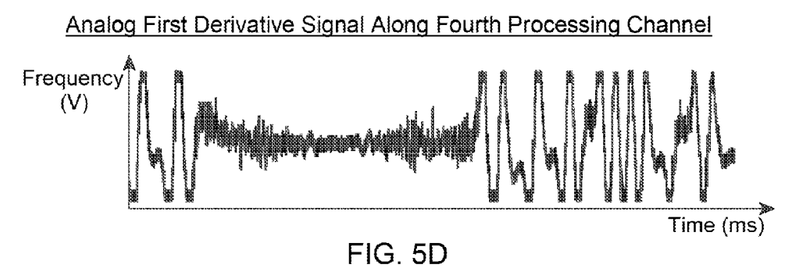

In a first illustrative embodiment, only the digital first derivative data signals $\{f'_n(t)\}$ are transmitted to the programmed decode processor 208 for use during decode processing and the SDGC module 109 for processing into digital control data. As shown in FIGS. 5A, 5B, 5C and 5D, the analog first derivative signal produced in each signal processing channel has a different signal amplitude due to different levels of cascaded amplification/gain in each channel and different dynamic amplitude characteristics due to different levels of spectral filtering along each channel. As shown in FIG. 5A, the signal level is very low and the signal peaks are close to the noise level, not making this first derivative signal a good candidate during decode processing. As shown in FIG. 5D, the signal level is saturated and clipping occurs during signal level peaks, creating distortion and not making this first derivative signal a good candidate during decode processing. However, as shown in FIGS. 5B and 5C, the first derivative signals here are well amplified above the noise level, and are not saturated, and the first derivative signals from either or both of these first derivative signal processing channels are good candidates for use in decode processing, and thus, the programmed decode processor 208 will likely select the digital first derivative signals $f_2'(t)$ and/or $f_3'(t)$ from the second and third signal processing channels, for decode processing during the given scanning cycle.

Alternatively, the digital raw scan data signals $\{f_n(t)\}$ produced from the raw scan data signal processing channels 107B through 107N can be provided to the intermediate processing module 108, and then to the decode processing module 208, for use in selective decode processing, using decoding techniques well known in the art. Also, in other alternative embodiments, both the digital raw scan data intensity data signals $\{f_n(t)\}$ produced from the raw scan data signal processing channels 107B through 107N, and the full set of digital first derivative data signals $\{f_n'(t)\}$ associated with the first derivative signal processing channels 107B' through 107N', can be transmitted to the programmed decode processor 208, via the intermediate signal processing module 108, for combined use during decode processing, in a manner well known in the art. Expectedly, during each scanning cycle, the decode processing module 208 will select the digital data signals ($f_n(t)$ and/or $f_n'(t)$) from the set of digital data signals ($\{f_n(t)\}$, and/or $\{f_n'(t)\}$) having the highest SNR and/or not being saturated or clipped during signal processing along the different signal processing channels within subsystem 107.

The SOS/EOS detector 127 generates a SOS signal upon detecting the start of the first and each subsequent laser beam scanning cycle, and these SOS signals are transmitted to the SDGC module 109 and the programmed decode processor 208. The SDGC module 109 uses the SOS signal from detector 127 and the digital first derivative signals $\{f_n'(t)\}$ from the multi-channel parallel cascaded signal processing subsystem (e.g. ASIC chip) 107 to generate digital control data signals for transmission to the digitally-controlled first amplification stage 107B1 along the first signal processing channel 107B, to control the gain thereof, during a corresponding scanning cycle, in accordance with the principles of the present disclosure. This process is repeated each cycle to control the gain of the amplification stage in subsystem 107. Also, the programmed decode processor 208 decode processes digital data signals, and generates symbol character data representative of each bar code symbol scanned by the laser scanning beam. Symbol character data corresponding to the bar codes read by the programmed decoder 208 is then transmitted to the host system via the I/O communication interface 109 which may support either a wired and/or wireless communication link, well known in the art. During laser scanning operations, the system controller 150 automatically generates the necessary control signals for controlling operations within the hand-supportable laser scanning bar code symbol reading system.

Figure 4A:
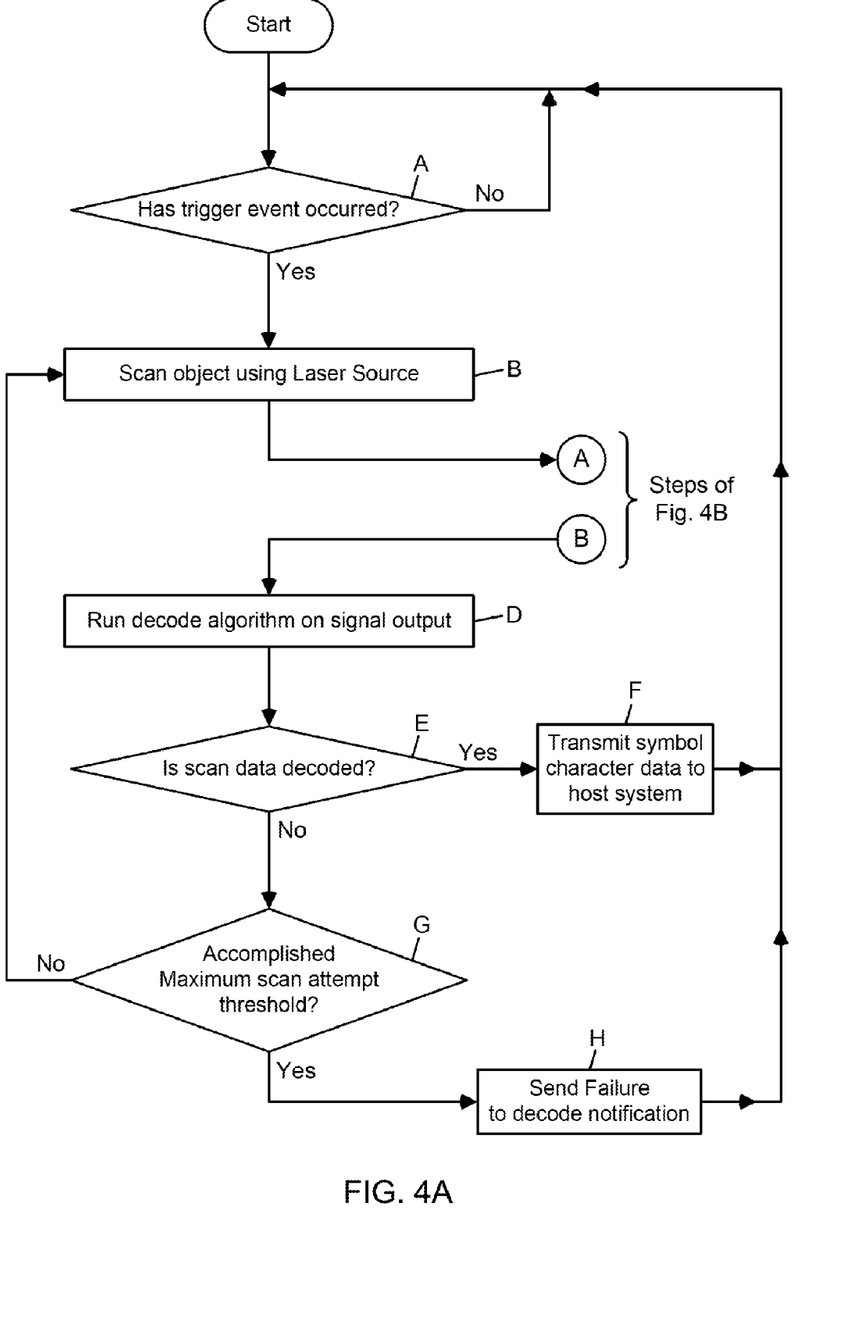
FIG. 4A is a flow chart describing the primary steps carried out in the laser scanning bar code symbol reading system of FIG. 3, wherein upon detecting a trigger event in the system, the bar code symbol is automatically laser scanned and scan data is captured and processed to automatically control the gain of the first channel amplifier stage in a synchronized manner, and any bar code symbol represented by collected digitized scan data is decoded (i.e. read) during the laser beam scanning cycle.

Referring to FIG. 4A, a method will now be described for reading bar code symbols using the laser scanning bar code reader 100, described above, wherein the gain of the analog scan data signal processing stage in module 106, is automatically controlled in a synchronized manner, as the analog scan data signal is collected and processed, and digital data signals are generated and processed by the SDGC module 109 during each laser beam scanning cycle.

As indicated in FIG. 4A, the process orchestrated by system controller 150 begins at the START Block. Then at Block A, the system controller 150 determines if a trigger event has occurred (i.e. whether or not trigger 104 has been manually depressed by the operator upon seeing an object in the laser scanning field and pointing the head portion of the housing towards the object). When the trigger event is detected at Block A, the system controller 150 enables, at Block B, the laser scanning module 105 (including the laser VLD 112, scanning mechanism and associated electronics and photo-electronics) to scan the object with a laser scanning beam generated by the VLD 112, and collect and buffer a pair of lines of scan data in buffers 160, representative of collected scan data from the laser scanned object during both laser scanning directions.

As shown in FIG. 4A, at Block C, the SDGC process of the present disclosure is carried out in an automatic manner, during each laser scanning cycle, to control the gain of the first amplification stage in the first signal processing channel of multi-channel parallel signal processing subsystem 107, at the beginning of each laser scanning cycle, and this value is stored and used only for this laser scanning cycle and will be updated during the beginning of the next scanning cycle, as described in detail below with reference to FIGS. 4A through 5B.

As indicated at Block D in FIG. 4A, the decode processor 208 runs a decode algorithm on the captured lines of scan data buffered in the scan line data buffer 160. If at Block E, a bar code symbol is decoded, then at Block F, the produced symbol character data is transmitted to the host system, and the system controller returns to Block A.

If, however, at Block E in FIG. 4A a bar code symbol is not decoded, then the system controller 150 determines at Block G whether or not the maximum scan attempt threshold has been reached, and if not, then the system controller 150 returns to Block B, and resumes the flow as indicated. However, if at Block G, the system controller 150 determines that the maximum scan attempt threshold has been accomplished, then the system controller 150 proceeds to Block H and sends a Failure to Decode notification to the operator, and returns to Block A, as shown.

Figure 4B:
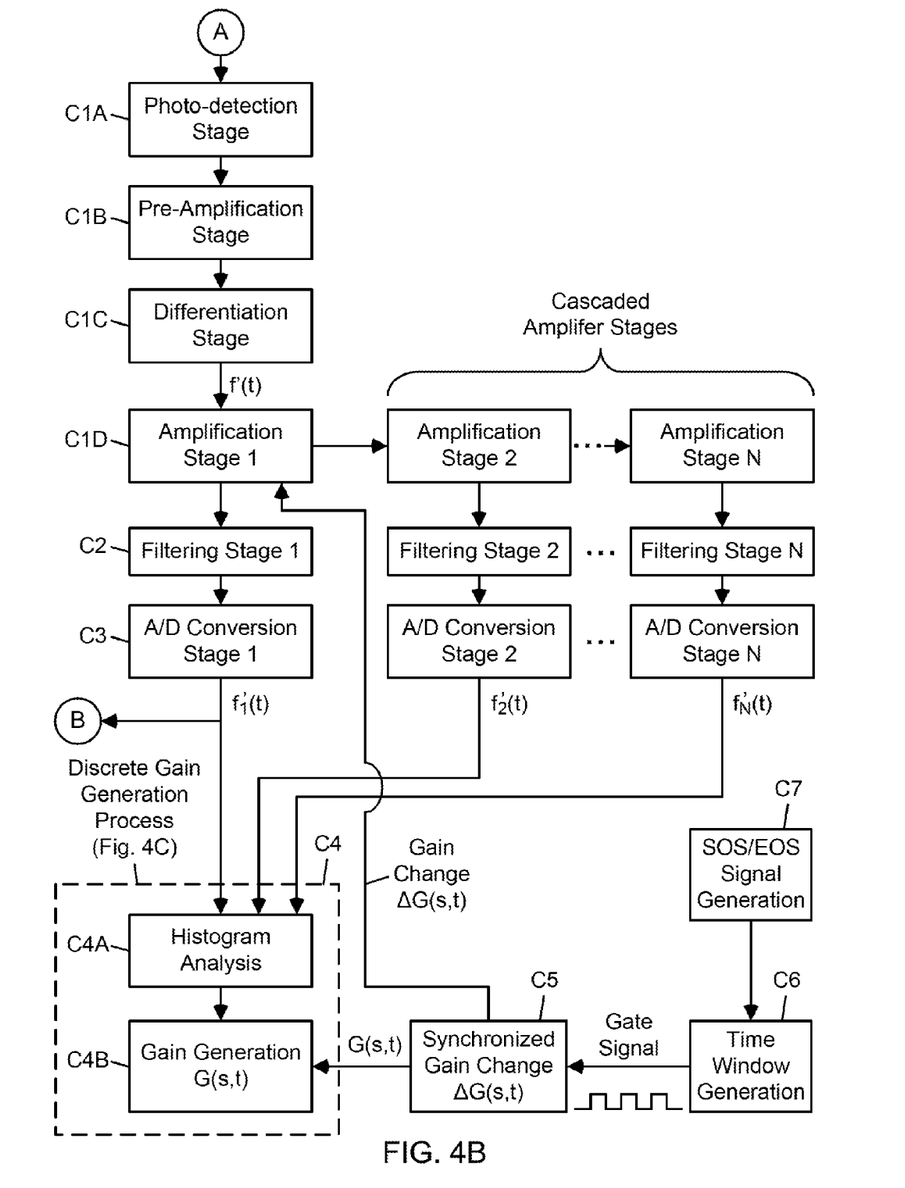
FIG. 4B is a flow chart describing the steps carried out during the synchronized digital gain control (SDGC) process of FIG. 3, where the analog scan data signal (i.e. analog barcode pattern signal) is processed during a synchronized time window (i.e. between generation of the SOS and EOS signals during each scanning cycle)

Specification of the Synchronized Digital Gain Control Process within the Multi-Channel Parallel Cascaded Scan Data Signal Processing Subsystem FIG. 4B describes the steps carried out during the synchronized digital gain control (SDGC) process of FIG. 3, which is automatically and transparently called at Block C in the system control process described in FIG. 4A, at the beginning of each scanning cycle.

As indicated at Block C1A in FIG. 4B, the first step of the SDGC process begins at photo-detection stage (i.e. photo-detector) where collected return laser light is detected by the photo-detector and a corresponding analog scan data signal or analog barcode pattern signal (BPS) is generated.

As indicated at Block C1B in FIG. 4B, the pre-amplification stage pre-amplifies the raw analog scan data signal F(t).

As indicated at Block C1C in FIG. 4B, the first differentiation stage generates (i.e. derives) an analog first derivative signal from the raw analog scan data signal F(t).

As indicated at Block C1D in FIG. 4B, the first amplification stage amplifies the first derivative signal by the gain value determined by the SDGC module 109 during each scanning cycle. As shown, the first amplification stage passes the amplified first derivative signal to the second amplification stage; the third amplification stage passes the amplified first derivative signal to the fourth amplification stage; and so on, for each subsequent signal processing channel, in a cascaded manner, as shown in FIG. 4B.

As shown, each signal processing channel filters the amplified first derivative signal at Block C2, and then converts to the amplified and filtered analog first derivative signal into a digital first derivative data signal $f_n'(t)$ at Block C3, which are fed to the histogram analysis stage C4A at Block C4.

Figure 4C:
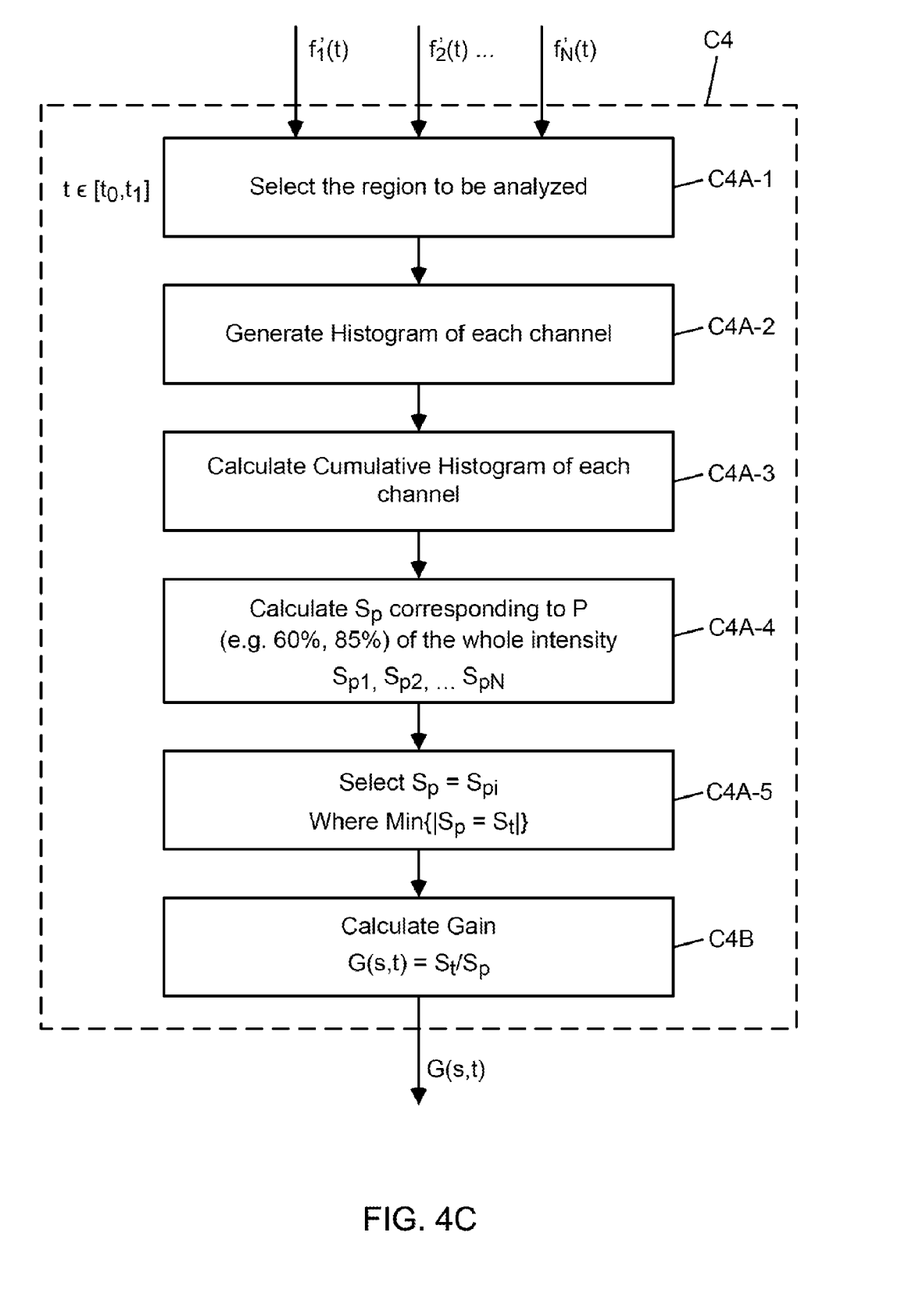
FIG. 4C is a flow chart describing a preferred method of processing the digital data signals (e.g. digital first derivative signals from the different signal processing channels) using histogram analysis and gain calculation.

As shown in FIGS. 5A, 5B, 5C and 5D, each analog first derivative signal, and corresponding n-th digital first derivative data signal LAO has a different signal amplitude and a different dynamic range (due to spectral filtering), and provides indications of the strength or magnitude in signal level transitions that are useful during decode processing, as well as during the synchronized digital gain control process described in FIGS. 4B and 4C.

As indicated a Block C4 in FIG. 4B, a discrete gain calculation/estimation process is carried out at the beginning (i.e. start) of each scanning cycle (i.e. in response to detection of the SOS signal) using a two-step method, namely: performing a histogram analysis on the time-sampled digital first derivative signal $f_n'(t)$ indicated at Block C4A; and generating a discrete gain value G(s,t) for the first amplification stage of first signal processing channel in subsystem 107, as indicated at Block C4B. In general, the discrete gain signal G(s,t) is a function of the signal strength (e.g. intensity or amplitude), and timing window, [t]. The signal strength could be, but is not limited to, the first derivative signal, raw digital scan data signal, etc. The timing window [t] is generated by the SOS/EOS detector which can be implemented in different ways depending on the type of laser scanning system used. This ensures that gain change occurs only during the synchronized time window (i.e. when the gate timing signal goes to a logical high value) so that the signal has constant gain during each scanning cycle (i.e. laser beam sweep).

In FIG. 4C, the digital gain calculation/estimation process of the preferred embodiment is described in greater detail. As shown, this process comprises the following steps: at Block C4A-1, selecting a time region over which the sampled digital first derivative data signals $\{f_n'(t)\}$ are to be analyzed (e.g. from t1 to t0); at Block C4A-2, generate a histogram on each signal processing channel based on the region of the sampled digital first derivative signal $f_n'(t)$ selected in Block C4A-1; at Block C4A-3, calculating a cumulative histogram of each signal processing channel based on the histogram generated in Block C4A-2; at Block C4A-4, calculating the current signal level $S(p_n)$ for each n-th signal processing channel, corresponding to the frequency of the signal level, p, observed over the selected time region (e.g. 60% or 85% of the whole intensity value), to provide $S_{p1}, S_{p2}, \ldots S_{pN}$; at Block C4A-5, select $S_p = S_{pi}$, where $\text{Min}\{|S_p - S_t|\}$; and at Block C4B, calculating the discrete gain value G(s,t), for the current scanning cycle, using the following formula: $G(s,t) = S_t/S_p$ where $S_t$ is the target signal level, and $S_p$ is the current signal level corresponding to P (e.g. 60% or 85%) of the whole cumulative histogram. This process will be described in greater technical detail below, after a brief discussion on gain selection.

For the cascaded amplification stages in the multi-channel parallel cascaded signal processing subsystem 107, the gains are indicated by $G_1, G_2, G_3, \ldots, G_{N-1}, G_N$ which correspond to the gain values for amplification stages $1, 2, 3, \ldots, N-1, N$. Notably, gains $G_2, G_3 \ldots G_{N-1}, G_N$ are fixed gain stages, and gain $G_1$ is the only gain parameter to be adjusted each scanning cycle, in synchronism with generated SOS signals. In the cascaded gain architecture of the multi-channel parallel cascaded signal processing subsystem 107, the output analog first derivative signal $S_1$ from the first amplification/gain stage 107B1 in the first signal processing channel, is given by $S_1$. The output analog first derivative signal $S_2$, from the second amplification/gain stage 107C1 in the second signal processing channel, is given by $S_2 = G_2 S_1$. The output analog first derivative signal $S_3$, from the third amplification/gain stage 107D1 in the third signal processing channel, is given by $S_2 = G_2 G_3 S1$. The output analog first derivative signal $S_4$, from the fourth amplification/gain stage 107E1 in the fourth signal processing channel, is given by $S_4 = G_2 G_3 G_4 S_1$. Likewise, the output analog first derivative signal $S_N$, from the Nth amplification/gain stage 107(N)1 in the N-th signal processing channel, is given by $S_N = G_N, \ldots G_3 G_2 S_1$.

As indicated at Block C4A-1 in FIG. 4C, a given digital first derivative signal $f_n'(t)$ for the n-th signal processing channel is sampled over a selected time region, extending from a start point at time t1, to an end point at time t2. The sampled digital first derivative signal $f_n'(t)$ is buffered within the SDGC module for subsequent processing. The system can be configured so that the selected time region occurs over a certain area/region of the scan line (e.g. the left side of the scan line, the right side of the scan line, or in the center region of the scan line).

Figure 6A:
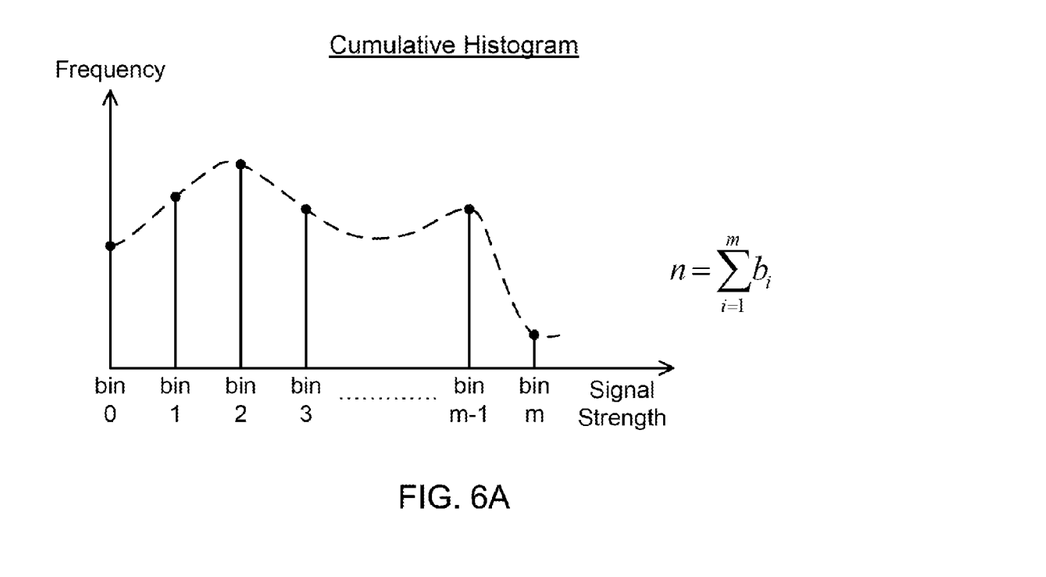
FIG. 6A is a schematic representation of a cumulative histogram of sampled signal strength values within the digital scan data signal generated from a given signal processing channel within the multi-channel parallel cascaded signal processing subsystem.

As indicated at Block C4A-2 in FIG. 4C, a histogram is calculated for each signal processing channel for the sampling scanning cycle by classifying each sample point in the sampled digital first derivative data signal $f_n'(t)$ into one or M possible bins (i.e. storage locations), where each bin represents a particular signal level or range of signal level of the digital first derivative data signal $f_n'(t)$, as illustrated in FIG. 6A. For the time interval [t1, t2], the frequency of the signal level associated with each bin is calculated to provide the histogram shown in FIG. 6A. Notably, this histogram analysis removes the effects of strong return laser signals having great differences in signal intensity produced when laser scanning targets with surface areas (i) having specular-type reflection characteristics and/or (ii) located at different distances from the laser scanner, etc.

Figure 6B:
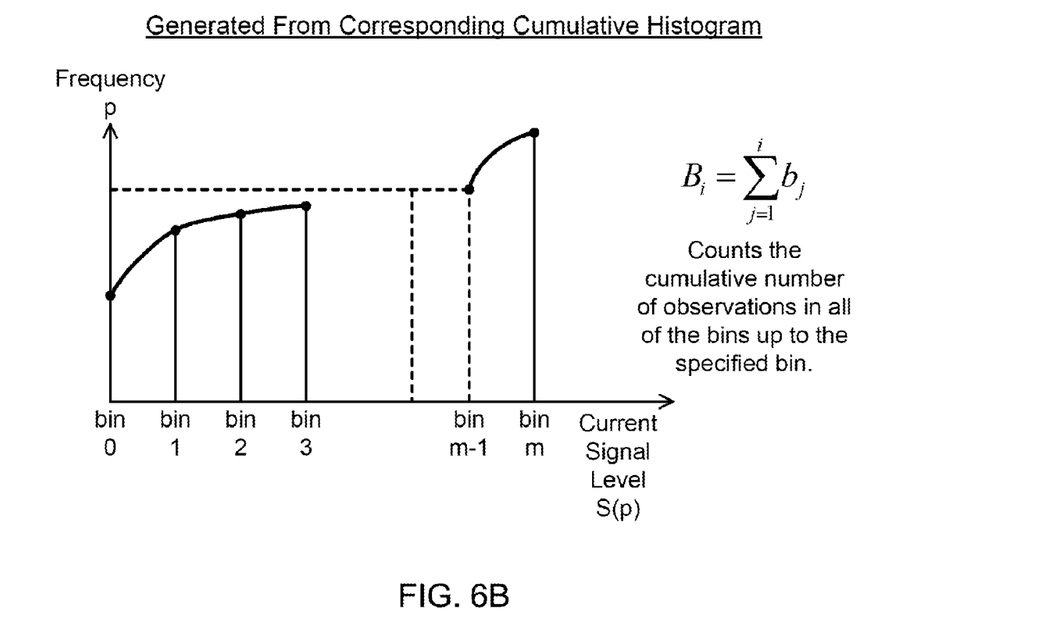
FIG. 6B is a schematic representation generated from a corresponding cumulative histogram, plotting frequency versus current signal level within the digital scan data signal generated from a given signal processing channel within the multi-channel parallel cascaded signal processing subsystem.

As indicated at Block C4A-3 in FIG. 4C, a cumulative histogram for each signal processing channel is calculated using the corresponding histogram by counting the cumulative number of observed signal levels (i.e. observations on LAO) in all of the bins up to the specified bin, as illustrated in FIG. 6B.

As indicated at Block C4A-4, the current signal level $S_{pn}$ corresponding to percentage p (e.g. 60% or 85%) of the whole cumulative histogram of the channel's intensity, using the formula $S_{p1}, S_{p2} \ldots S_{pN}$ where $S_{pn}$, can be calculated from the histogram and cumulative histograms of each channel n, as illustrated in FIG. 6B.

The goal of the SDGC process is to adjust $G_1$ during each scanning cycle so that one signal processing channel has the right or optimal signal amplitude level, $S_{p1}, S_{p2}, \ldots S_{pN}$.

To achieve this, select $S_p = S_{pi}$, where $\text{Min}\{|S_p - S_t|\}$, i.e. Min of $|S_{p1} - S_t|, |S_{p2} - S_t|, \ldots |S_{pN} - S_t|$, where $S_t$ is the target signal level.

Then, as indicated at Block C4B in FIG. 4C, a discrete gain value G(s,t) is calculated for the current scanning cycle using the following formula: $G(s,t)=S_t/S_p$ where $S_t$ is the target signal level, and $S_p$ is the current signal level corresponding to a percentage p (e.g. 60% or 85%) of the whole cumulative histogram for the n-th signal processing channel.

In general, the target signal level $S_t$ is the signal level at which system performance is optimized and is set prior to system operation. Typically, this value is determined from experimentation, and while it will be dependent upon the stage at which SDGC is applied, this target value should remain constant during a long period of operation of the system. Such experimentation will typically take place during system design, but may be carried out during a diagnostic procedure during which $S_t$ is determined experimentally and then programmed into the SDGC module prior to system operation. Notably, the units of measure of $S_t$ will depend on the signal processing stage where SDGC is applied. However, regardless of whether SGDC is applied to the preamplifier stage in the photo-collection and detection module or derivative or other amplification stages in the analog signal processing/digitizing module, the $S_t$ value typically will be chosen as a percentage of the maximum possible signal swing that such signal amplification/gain circuitry can operate, without going into a state of saturation or otherwise generating undesired non-linear signal distortion due to excessive swings in voltages that maintain the operation of the amplification circuitry.

As indicated in the SDGC process of FIG. 4B, the discrete gain value $G(s,t)$ calculated in Block C4 is provided to Block C5, where a synchronized gain change value $\Delta G(s,t)$ is computed for the current time window (i.e. laser beam scanning cycle) determined by time window block C6, driven by SOS/EOS signal generation block C7, as described above.

The synchronized gain change value $\Delta G(s,t)=G'=G(s,t)G1$ where G1 is the original gain value.

The synchronized discrete gain change value $\Delta G(s,t)$ (i.e. a digital numerical value) is then transmitted to the digitally-controlled analog amplification stage at Block C1D, to instantly change the gain of this stage to a new gain value determined by the synchronized discrete gain change value $\Delta G(s,t)$. Thus, by selecting the target signal level $S_t$ at an optimum value of system operation, the SDGC module automatically computes and applies the synchronized discrete gain change value $\Delta G(s,t)$, during each scanning cycle (i.e. time window) so that the output signal level from the digitally-controlled analog amplification stage closely approaches the target signal level $S_t$ and system performance is optimized.

Figure 7A:
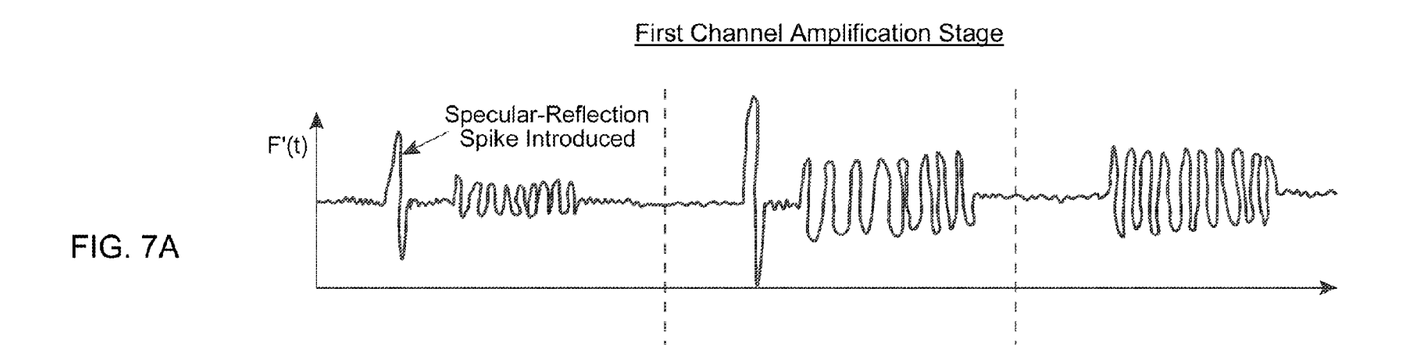
FIGS. 7A, 7B and 7C, when taken together, illustrate how the SDGC module controls the gain of the digitally-controlled first channel amplification stage of the multi-channel parallel cascaded signal processing subsystem, over three consecutive time windows (i.e. laser beam scanning cycles).
Figure 7B:
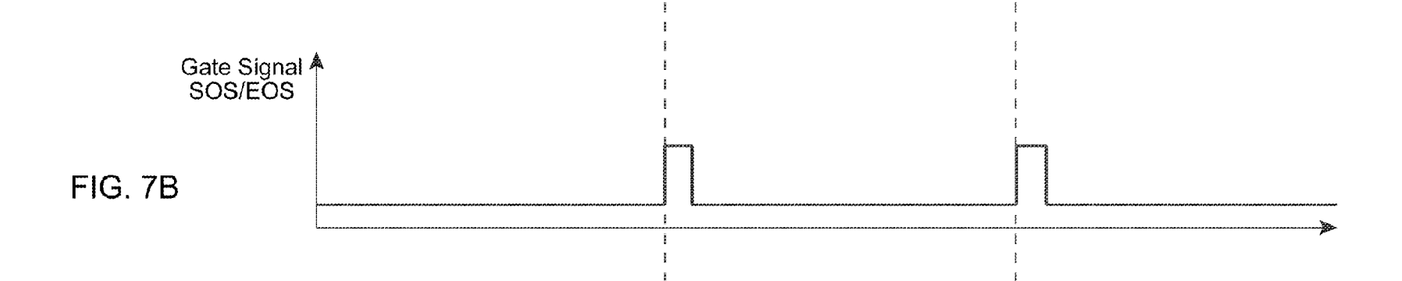
Figure 7C:
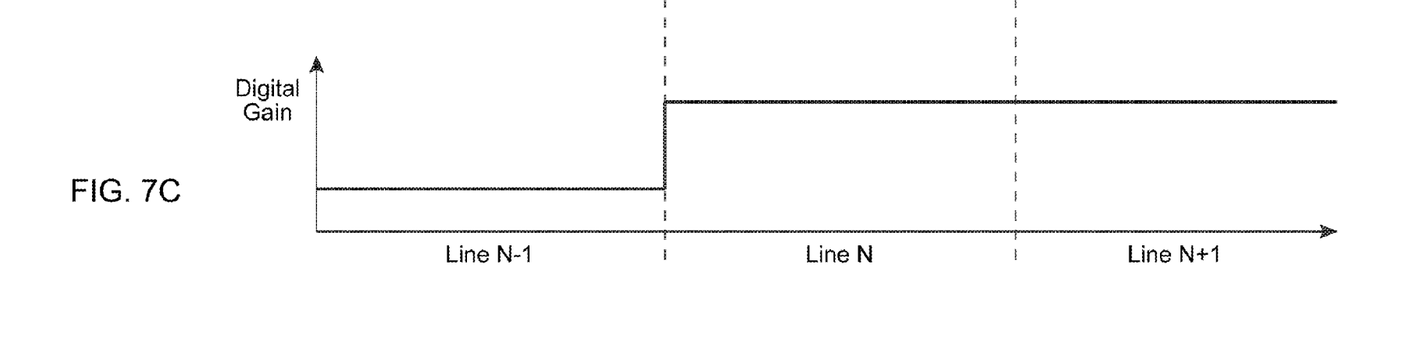

Having described the operation of the SDGC process during each scanning cycle, it now will be helpful to refer to FIGS. 7A through 7C and describe how an analog scan data signal is processed by a stage of signal processing circuitry having its gain controlled by the SDGC module 109 over three consecutive time windows (i.e. scanning cycles).

As shown in FIGS. 7A, 7B and 7C, during the first (initial) scanning cycle, scan line N−1 is generated and associated scan data collected. As shown, the SOS signal is logically low, the gain is maintained at a first constant level, and the analog raw scan data intensity signal F(t) (or analog first derivative thereof F'(t)) is amplified by the first gain level.

During the second scanning cycle, scan line N is generated and associated scan data collected. As shown, the SOS signal transitions from a logically low to logically high value (indicating a new scanning cycle), the gain is increased at a second constant level, and the analog raw scan data intensity signal F(t) (or first derivative signal F'(t)) is amplified by the second gain level.

Then, during the third scanning cycle, scan line N+1 is generated and associated scan data collected. As shown, the SOS signal transitions from a logically low to logically high value (indicating a new scanning cycle), the gain is maintained constant at the second gain level, and the analog raw scan data intensity signal F(t) (or first derivative signal F'(t)) is amplified by the same second gain level.

Thereafter, the SDGC process repeats itself automatically, each and every scanning cycle, in a manner transparent to the system user, to maintain the intensity of processed analog scan data signals relatively constant before conversion into corresponding digital data signals.

Some Modifications which Readily Come to Mind

While synchronized digital gain control (SDGC) module of the present disclosure has been shown implemented inside the programmed decode processor, it is understood that this module could be implemented in other locations, wherever digital signal processing is supported.

As disclosed, the digitized data processed by the SDGC module can be digital raw intensity data and/or digital first derivative data. However, it may also be digital absolute value first derivative data, any other combination of the three different types of digital data.

Also, it is understood that histogram generated by the SDGC module for each signal processing channel can be analyzed on a whole scan line data or a specific region thereof, and the histogram can be formed with sub-sampling or without sub-sampling.

While the illustrative embodiments disclose the use of a 1D laser scanning module to detect scan bar code symbols on objects, it is understood that a 2D or raster-type laser scanning module can be used as well, to scan 1D bar code symbols, 2D stacked linear bar code symbols, and 2D matrix code symbols, and generate scan data signals for decoding processing.

While various optical code symbol reading systems have been illustrated, it is understood that these laser scanning systems can be packaged in modular compact housings and mounted in fixed application environments, such as on counter-top surfaces, on wall surfaces, and on transportable machines such as forklifts, where there is a need to scan code symbols on objects (e.g. boxes) that might be located anywhere within a large scanning range (e.g. up to 20+ feet away from the scanning system). In such fixed mounted applications, the trigger signal can be generated by manual switches located at a remote location (e.g. within the forklift cab near the driver) or anywhere not located on the housing of the system, as well as by automatically by IR or LED-based object detection subsystems, or manually-actuated trigger switches, well known in the art.

Also, the illustrative embodiments have been described in connection with various types of code symbol reading applications involving 1-D and 2-D bar code structures (e.g. 1D bar code symbols, 2D stacked linear bar code symbols, and 2D matrix code symbols). However, the methods and apparatus can be used to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

It is understood that the digital-imaging based bar code symbol reading system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the Claims appended hereto.

The invention claimed is:

1. A code symbol reading system, comprising:
   a scanning module for scanning a light beam across a scanning field in a scanning cycle;
   a scan line detector for detecting a start of each scanning cycle performed by the scanning module and generating a start of scan (SOS) signal in response to the detection of the start of each scanning cycle;
   a photo-detector for detecting the intensity of light reflected from the scanning field and generating a first signal corresponding to the detected light intensity;
   a signal processor, comprising:
      a first processing channel for generating a first data signal and a first derivative data signal, the first processing channel having:
         a first differentiation stage for processing the first signal and generating a first derivative signal; and
         a first amplification stage for amplifying the first signal and the first derivative signal using a gain; and
      a second processing channel for generating a second data signal and a second derivative data signal and having a second amplification stage for amplifying the amplified first signal and the amplified first derivative signal generated by the first amplification stage using a fixed gain;
   a gain control module for, during each scanning cycle, controlling the gain of the first processing channel's first amplification stage within the signal processor using the SOS signal generated by the scan line detector, the first data signal and the first derivative data signal generated by the first processing channel, and the second data signal and the second derivative data signal generated by the second processing channel; and
   a decode processor for processing the first data signal, the first derivative data signal, the second data signal, and the second derivative data signal and generating data representative of a code symbol in the scanning field.

2. The code symbol reading system of claim 1, wherein the scanning module comprises a rotating polygon or an oscillating mechanism for scanning the light beam across the scanning field.

3. The code symbol reading system of claim 1, wherein the scanning module comprises:
   a laser source;
   a laser drive module for driving the laser source to produce the light beam; and
   a laser scanning mechanism for scanning the light beam across the scanning field.

4. The code symbol reading system of claim 1, wherein the gain control module comprises a programmed microprocessor.

5. The code symbol reading system of claim 1, the signal processor's first processing channel having:
   a first filtering stage for filtering the amplified first signal and the amplified first derivative signal from the first amplification stage and generating a filtered amplified first signal and a filtered amplified first derivative signal; and
   a first conversion stage for converting the filtered amplified first signal into the first data signal and the filtered amplified first derivative signal into the first derivative data signal.

6. A code symbol reading system, comprising:
   a scanning module for scanning a light beam across a scanning field in a scanning cycle;
   a scan line detector for detecting a start of each scanning cycle performed by the scanning module and generating a start of scan (SOS) signal in response to the detection of the start of each scanning cycle;
   a photo-detector for detecting the intensity of light reflected from the scanning field and generating a first signal corresponding to the detected light intensity;
   a signal processor, comprising:
      a first processing channel for generating a first derivative data signal, the first processing channel having:
         a first differentiation stage for processing the first signal and generating a first derivative signal; and
         a first amplification stage for amplifying the first derivative signal using a gain; and
      a second processing channel for generating a second derivative data signal and having a second amplification stage for amplifying the amplified first derivative signal generated by the first amplification stage using a fixed gain;
   a gain control module for, during each scanning cycle, controlling the gain of the first processing channel's first amplification stage within the signal processor using the SOS signal generated by the scan line detector, the first derivative data signal generated by the first processing channel, and the second derivative data signal generated by the second processing channel; and
   a decode processor for processing the first derivative data signal and second derivative data signal and generating data representative of a code symbol in the scanning field.

7. The code symbol reading system of claim 6, comprising a hand-supportable housing or a fixed-mounted housing.

8. The code symbol reading system of claim 6, wherein the scan line detector detects an end of each scanning cycle performed by the laser scanning module and generates an end of scan signal in response to the detection of the end of each scanning cycle.

9. The code symbol reading system of claim 6, wherein:
   in response to the SOS signal during each scanning cycle, the gain control module processes the first derivative data signal generated by the first processing channel and the second derivative data signal generated by the second processing channel, generates a gain signal, and transmits the gain signal to the signal processor; and
   the first processing channel's amplification stage uses the gain signal to control the gain of the first derivative signal during each scanning cycle.

10. The code symbol reading system of claim 6, wherein the first derivative data signal generated by the first processing channel comprises absolute value derivative data of the first signal.

11. A code symbol reading system, comprising:
   a scanning module for scanning a light beam across a scanning field in a scanning cycle;
   a scan line detector for detecting a start of each scanning cycle performed by the scanning module and generating a start of scan (SOS) signal in response to the detection of the start of each scanning cycle;
   a photo-detector for detecting the intensity of light reflected from the scanning field and generating a first signal corresponding to the detected light intensity;
   a signal processor, comprising:
      a first processing channel for generating a first data signal and having a first amplification stage for amplifying the first signal using a gain; and
      a second processing channel for generating a second data signal and having a second amplification stage for amplifying the amplified first signal generated by the first amplification stage using a fixed gain;

a gain control module for, during each scanning cycle, controlling the gain of the first processing channel's first amplification stage within the signal processor using the SOS signal generated by the scan line detector, the first data signal generated by the first processing channel, and the second data signal generated by the second processing channel; and a decode processor for processing the first data signal and second data signal and generating data representative of a code symbol in the scanning field.

12. The code symbol reading system of claim 11, the signal processor's first processing channel having:
- a first filtering stage for filtering the amplified first signal from the first amplification stage and generating a filtered amplified first signal; and
- a first conversion stage for converting the filtered amplified first signal into the first data signal.

13. The code symbol reading system of claim 11, the signal processor's second processing channel having:
- a second filtering stage for filtering the amplified first signal from the second amplification stage and generating a filtered amplified second signal; and
- a first conversion stage for converting the filtered amplified second signal into the second data signal.

14. The code symbol reading system of claim 11, comprising a communication interface for transmitting and receiving signals from a host system.

15. The code symbol reading system of claim 11, wherein:
in response to the SOS signal during each scanning cycle, the gain control module processes the first data signal generated by the first processing channel and the second data signal generated by the second processing channel, generates a gain signal, and transmits the gain signal to the signal processor; and the first processing channel's amplification stage uses the gain signal to control the gain of the first signal during each scanning cycle.

16. The code symbol reading system of claim 11, wherein:
in response to the SOS signal during each scanning cycle, the gain control module processes the first data signal generated by the first processing channel and the second data signal generated by the second processing channel, calculates a first histogram from the first data signal and a second histogram from the second data signal, calculates a cumulative histogram from the first histogram and the second histogram, calculates a discrete gain for the scanning cycle from the cumulative histogram, calculates a discrete gain change from the discrete gain, and transmits the discrete gain change as a gain signal to the signal processor; and the first processing channel's amplification stage uses the gain signal to control the gain of the first signal during each scanning cycle.

17. The code symbol reading system of claim 16, wherein the first histogram and the second histogram are calculated using sub-sampling.

18. The code symbol reading system of claim 11, wherein the scanning module comprises a rotating polygon or an oscillating mechanism for scanning the light beam across the scanning field.

19. The code symbol reading system of claim 11, wherein the scanning module comprises:
- a laser source;
- a laser drive module for driving the laser source to produce the light beam; and
- a laser scanning mechanism for scanning the light beam across the scanning field.

20. The code symbol reading system of claim 11, wherein the gain control module comprises a programmed microprocessor.

* * * * *